United States Patent [19]

Williams et al.

[11] Patent Number: 4,564,660

[45] Date of Patent: Jan. 14, 1986

[54] USE OF ALKYLALUMINUM COMPOUNDS AND HYDROXYL-CONTAINING COMPOUNDS TO INITIATE POLYMERIZATION OF ETHYLENE WITH CHROMIUM OXIDE CATALYSTS

[75] Inventors: Gary H. Williams, Somerville; Frederick J. Karol, Belle Mead, both of N.J.

[73] Assignee: Union Carbide Corporation, Danbury, Conn.

[21] Appl. No.: 509,602

[22] Filed: Jun. 30, 1983

[51] Int. Cl.$^4$ .......................... C08F 2/34; C08F 10/02
[52] U.S. Cl. ..................................... 526/106; 526/77; 526/105; 526/100; 526/901; 526/912
[58] Field of Search ................. 526/77, 105, 106, 100, 526/901, 912

[56] References Cited

U.S. PATENT DOCUMENTS

| | | | |
|---|---|---|---|
| 2,970,135 | 1/1961 | Lanning et al. | 526/901 |
| 3,050,514 | 8/1962 | Cawthon et al. | 526/105 |
| 4,376,191 | 3/1983 | Geck | 526/102 |

FOREIGN PATENT DOCUMENTS

| | | | |
|---|---|---|---|
| 654208 | 12/1962 | Canada | 526/77 |
| 845073 | 8/1960 | United Kingdom | 526/106 |

*Primary Examiner*—Edward J. Smith
*Attorney, Agent, or Firm*—John S. Piscitello

[57] ABSTRACT

A method for smoothly and reliably initiating polymerization of ethylene with a supported chromium oxide catalyst, with smaller amounts of catalyst and in substantially shorter periods of time then heretofore required, by adding an alkylaluminum compound and a hydroxyl-containing compound to the reactor of a polymerization reaction system prior to the commencement of polymerization and subjecting said alkylaluminum compound and hydroxyl-containing compound to suitable conditions of temperature and pressure for a time sufficient for said alkylaluminum compound to react completely with the moisture present in said reactor and said hydroxyl-containing compound.

30 Claims, No Drawings

USE OF ALKYLALUMINUM COMPOUNDS AND HYDROXYL-CONTAINING COMPOUNDS TO INITIATE POLYMERIZATION OF ETHYLENE WITH CHROMIUM OXIDE CATALYSTS

FIELD OF THE INVENTION

This invention relates to a method for initiating polymerization of ethylene with a supported chromium oxide catalyst in a smooth and controllable manner, and for reducing the start-up time required to initiate such polymerization.

BACKGROUND OF THE INVENTION

From time to time during the production of ethylene homopolymers and copolymers in a commercial reactor, it is necessary to shut down the polymerization reactor for periodic maintenance and cleaning. In order to re-initiate polymerization following such shutdowns when supported chromium oxide is intended to be used as catalyst in the process, it is frequently necessary to introduce a quantity of such catalyst into the reactor that is many times that required to carry on reaction at a normal rate due to the presence of moisture and other catalyst poisons in the reactor which react with the catalyst and inhibit polymerization. In spite of the large amount of catalyst employed, polymerization usually does not initiate for at least 4 to 12 hours following introduction of the catalyst into the reactor. Further, once polymerization does commence, it often proceeds very rapidly due to the large amount of catalyst present. Indeed, so rapid is the polymerization (and heat generation) that it presents the possibility of a runaway reaction. In the case of fluidized bed polymerizations, this results in fouling of the reactor due to fusing of the rapidly-formed polymer and/or sheeting of the polymer on the reactor wall where mixing and heat removal are not as effective as in the center of the bed.

One procedure suggested to initiate the polymerization of ethylene smoothly and reliably and reduce the possibility of a runaway reaction is to commence polymerization with a supported silyl chromate catalyst and then switch to the supported chromium oxide catalyst after polymerization has begun. However, this procedure suffers from the disadvantage that the properties of the initial polymerization product differ from the desired polymer properties, and hence a great deal of waste product must be produced before the desired product can be obtained. As a result, polymerization must be continued for a time sufficient to provide at least 4 to 6 reactor turnovers before the desired product can be obtained (i.e., at least the equivalent of 4 to 6 times the volume of polymer in the reactor must be removed from the reactor following the initiation of polymerization with the chromium oxide catalyst before polymers having the desired properties can be obtained).

SUMMARY OF THE INVENTION

In accordance with the present invention it has now been found that polymerization of ethylene with a supported chromium oxide catalyst can be initiated smoothly and reliably, with smaller amounts of catalyst and in substantially shorter periods of time than heretofore required, and with minimal deterioration of resin properties, by adding a suitable alkylaluminum compound and a suitable hydroxyl-containing compound to the reactor of a polymerization reaction system prior to the commencement of polymerization and subjecting said alkylaluminum compound and hydroxyl-containing compound to suitable conditions of temperature and pressure for a time sufficient for said alkyl-aluminum compound to react completely with the moisture present in said reactor and said hydroxyl-containing compound.

DESCRIPTION OF THE PREFERRED EMBODIMENTS

When start-up of the reactor is initiated in accordance with the present invention, it has been found that polymerization commences in a relatively short period of time after the chromium oxide catalyst is introduced into the reactor and increases gradually to the normal level in a smooth and controllable manner. As a result, the possibility of a runaway reaction is substantially eliminated. In the case of fluid bed polymerizations, the hot-spotting and reactor fouling which occur when such runaway reactions take place is prevented. Generally, no more than 3 hours after the catalyst is introduced into the reactor, and usually no more than 2 hours, are required before polymerization commences as compared to at least 4 hours which are normally required to initiate polymerization when employing a supported chromium oxide catalyst. As a result, polymerization can usually be initiated in less than one-half the time formerly required to initiate polymerization with a supported chromium oxide catalyst.

Furthermore, it has been found that large amounts of catalyst are not required to initiate polymerization according to the present invention, and that polymerization can be initiated in the presence of less than the usual amount of catalyst required for continuous polymerization. Following the commencement of polymerization, polymers having desired properties are obtained after no more than three reactor turnovers.

The alkylaluminum compounds employed in the process of the present invention can be illustrated by the formula:

$$AlR_aR_bR_c$$

wherein $R_a$, $R_b$ and $R_c$ are alkyl radicals, which radicals may be the same or different. Generally $R_a$, $R_b$ and $R_c$ are alkyl radicals containing from 1 to 12 carbon atoms, usually from 1 to 6 carbon atoms. Such radicals may be cyclic, branched or straight chain, and may be substituted with any substituent which is nonreactive with the catalyst and reactants present in the reactor. Illustrative of such radicals are methyl, ethyl, n-propyl, isopropyl, n-butyl, tert-butyl, n-hexyl, n-octyl, n-decyl, and the like.

Any solid organic or inorganic hydroxyl-containing compound having carbon-hydroxyl linkages or metal-hydroxyl linkages which are capable of reacting with the alkylaluminum compound employed, under the conditions of temperature and pressure present in the reactor, to form a Lewis salt, can be employed in the present invention. Such compounds should have a hydroxyl content of from 0.1 mmol/g to 10 mmol/g, preferably from 1.0 mmol/g to 5.0 mmol/g.

The hydroxyl-containing compound employed should also be porous and have a high surface area in order to expose a maximum number of the hydroxyl groups of such compound to contact and interaction with the alkylaluminum compound. For best results the surface area should exceed 25 square meters per gram, and preferably lies within the range of from 50 square meters per gram to 1000 square meters per gram. Such surface area not only provides maximum reaction of the hydroxyl groups of the hydroxyl-containing compound with the alkylaluminum compound, but also allows a minimum amount of the hydroxyl-containing compound to be used for this purpose. To further insure the availability of a maximum number of hydroxyl groups for interaction with the alkylaluminum compound, the hydroxyl-containing compound should not be dried at high temperatures or otherwise treated in any manner which will result in the removal or inactivation of the hydroxyl groups of such compound. Temperatures of from 100° C. to 250° C. are generally employed for drying to avoid undesirable dehydroxylation reactions.

Since the hydroxyl-containing compound is ultimately present as a contaminant in the polymerization product, it is desirable to employ such material in the form of small particles so that such product will be acceptable for commercial applications. Preferably, such particles have an average particle size no greater than 200 microns.

Among the hydroxyl-containing organic compounds which can be employed are materials such as poly(vinyl alcohol), hydroxyethyl cellulose, and the like. Suitable hydroxyl-containing inorganic materials include silica, alumina, thoria, zirconia, and the like. Mixtures of such hydroxyl-containing compounds may, of course, be employed if desired. Preferably, silica is employed as the hydroxyl-containing compound because it is commercially available in the desired particle size and surface area.

Before introducing the alkylaluminum compound and hydroxyl-containing compound into the polymerization reactor, the reactor is charged with a suitable polymerization medium, and the entire reaction system, including the polymerization medium, is purged under pressure with an inert gas in order to remove any volatile catalyst poisons, such as oxygen and moisture, which may be present in the system. In the case of a fluid bed polymerization, the polymerization medium consists of a bed of particulate polymer particles. In the case of a slurry polymerization, the polymerization medium consists of a liquid hydrocarbon diluent. By an "inert" gas is meant a gas which is nonreactive with the alkylaluminum and hydroxyl-containing compounds employed. Such gases include nitrogen, argon, xenon, helium and the like, as well as ethylene and the other alpha-olefins to be employed during polymerization. Typically purging is effected by passing such inert gas through the reaction system under a pressure of from 350 kPa to 2000 kPa, preferably under a pressure of from 350 kPa to 900 kPa. For greater effectiveness the gas is heated at a temperature of from 20° C. to 150° C., preferably from 70° C. to 100° C. Under no circumstances, however, should the temperature be permitted to exceed the sintering temperature of the polymer particles or the boiling point of the hydrocarbon diluent which constitute the polymerization medium.

Preferably, purging is continued until the gas in the reaction system contains no more than 50 ppm of moisture, most preferably until it contains no more than 20 ppm of moisture. Generally, purging for from 1 hour to 12 hours is required to reduce the moisture content to below 50 ppm. Somewhat longer times, generally from 2 hours to 15 hours, are required to reduce the moisture content to below 20 ppm. It is possible to initiate polymerization in the presence of a moisture content greater than 50 ppm, but such relatively high moisture contents are, of course, undesirable.

After the reactor has been purged with an inert gas, the alkylaluminum compound and the hydroxyl-containing compound are introduced into the reactor under substantially the same temperature and pressure conditions employed during the purge. In order to intersperse the alkylaluminum compound and the hydroxyl-containing compound throughout the reaction medium, appropriate circulation means should be maintained in the reactor. When polymerization is conducted in a slurry, stirring or agitation can be employed. When polymerization is conducted in a fluid bed, as is preferred, circulation of the alkylaluminum compound and the hydroxyl-containing compound throughout the bed can be effected by fluidizing the bed by means of the same inert gases employed during the purge. For economic reasons, it is preferred to continuously recycle this gas through the reaction system during this time.

The amount of alkylaluminum compound added to the reactor is related to the amount of moisture remaining in the reaction system after it has been purged with the inert gas and should be sufficient to react with at least a major amount of the moisture present in the reaction system. Ordinarily, at least 1 mol of such compound should be added to the system per mol of moisture still present therein. Preferably, from 1 mol to 2 mols of alkylaluminum compound are added per mol of moisture in the system. The moisture content of the gaseous phase of the system can be readily determined from a sampling and analysis of this phase. The moisture content of the non-gaseous phase, i.e., the hydrocarbon diluent in the case of slurry polymerizations or the polymer bed in the case of fluid bed polymerizations, can be readily estimated from the moisture content of the gaseous phase by assuming that one gram of non-gaseous material holds a like amount of moisture as one gram of gas.

The alkylaluminum compound is usually added to the reactor dissolved in an inert liquid solvent. By an "inert" liquid solvent is meant a solvent which is nonreactive with the alkylaluminum compound and the hydroxyl-containing compound employed. Hydrocarbons such as isopentane, hexane, heptane, toluene, xylene and naphtha are preferred for this purpose. Generally, such solutions contain from 1 weight percent to 99 weight percent of the alkylaluminum compound, usually from 2 weight percent to 12 weight percent of such compound.

Since the alkylaluminum compound can adversely affect the chromium oxide catalyst employed during polymerization and produce an undesirable decrease in the melt index of the polymers produced, its presence in the reactor during polymerization is undesirable. For this reason, the hydroxyl-containing compound is employed along with the alkylaluminum compound because of its capacity to react with the alkylaluminum compound. Although the hydroxyl-containing compound reacts with the alkylaluminum compound and prevents the alkylaluminum compound from modifying the catalyst in an adverse way, it does not affect the capacity of the alkylaluminum compound to assist the smooth and rapid commencement of polymerization.

The hydroxyl-containing compound should be employed in an amount sufficient to react with all of the alkylaluminum compound. In order to ensure complete reaction of all the alkylaluminum compound present, the hydroxyl-containing compound may be employed in excess of the stoichiometric amount required for this purpose. However, since the hydroxyl-containing compound ultimately appears as a contaminant in the polymer product, it is undesirable to add too large an excess. As a practical matter, from 150 percent to 600 percent, preferably from 200 percent to 400 percent, of the stoichiometric amount required to react with at least one alkyl group of each alkylaluminum molecule of the alkylaluminum compound should be employed. When silica is employed as the hydroxyl-containing compound, it has been found that from 0.7 kg to 2.6 kg of this material should be added for each mol of alkylaluminum compound employed, preferably from 0.8 kg to 1.3 kg per mol of alkylaluminum compound employed.

The order of addition of the alkylaluminum compound and the hydroxyl-containing compound to the reactor is not critical. Either compound may be added before the other, or both may be added together. If desired, the alkylaluminum compound may even be impregnated into the hydroxyl-containing compound and the impregnated material added to the reactor. When polymerization is conducted in a fluid bed, the order of addition is determined primarily by the composition of the particulate polymer particles which make up the bed at start-up. If the polymer particles employed have been prepared with the use of a supported chromium oxide catalyst and contain residues of the catalyst, it is preferred to add the hydroxyl-containing compound to the reactor prior to the alkylaluminum conpound. This is because it has been found that if the alkylaluminum compound is added first it may serve to reactivate the catalyst residue in the bed and institute premature polymerization. This premature polymerization may lead to the production of polymers of undesirably high molecular weight which appears as gels in the product. However, if the particulate polymer particles which make up the start-up bed are free of chromium oxide catalyst, or if these particles contain residues of such catalyst but have been exposed to air for a long period of time, it is preferred to add the alkylaluminum compound to the reactor before the hydroxyl-containing compound.

As stated above, when a fluid bed process is employed and the fluid bed is made up of particles which contain chromium oxide catalyst residues, it is preferred to add the hydroxyl-containing compound to the reactor prior to the alkylaluminum compound. After the hydroxyl-containing compound has been added, it is preferably circulated in the reactor bed for a time sufficient to thoroughly disperse it throughout the bed. This dispersion may be facilitated by the gradual addition of the hydroxyl-containing compound into the reactor. Generally from 1 to 4 hours are required to incorporate the hydroxyl-containing compound into the bed. When the alkylaluminum compound is subsequently added to the reactor, it contacts and reacts with the hydroxyl-containing compound already present in the bed. This reaction bonds the alkylaluminum compound to the hydroxyl-containing compound and prevents it from reacting with and reactivating the chromium oxide catalyst residue in the bed. As in the case of the hydroxyl-containing compound, dispersion of the alkylaluminum compound into the reactor may be facilitated by the gradual addition of this material to the reactor. Incorporation of this material into the reactor can generally be effected in from 1 to 3 hours.

When the alkylaluminum compound is added to the reactor first, it too is preferably circulated in the reactor bed for a time sufficient to thoroughly disperse it throughout the bed. Once again dispersion may be facilitated by the gradual addition of this material to the reactor. Generally from 1 to 5 hours are required to incorporate this material into the reactor. Subsequent addition of the hydroxyl-containing compound into the reactor may be effected over a like period of time.

After addition of the alkylaluminum compound and the hydroxyl-containing compound to the reactor has been completed, circulation may be continued for an additional period to ensure complete reaction of the alkylaluminum with the hydroxyl-containing compound. The time required for this purpose will, of course, depend upon the length of time employed in introducing these materials into the reactor, the particular alkylaluminum and hydroxyl-containing compounds employed, and the amounts of these materials that have been introduced into the reactor. Normally, from 1 to 12 hours are sufficient, most usually from 2 to 4 hours.

After reaction between the alkylaluminum compound and the hydroxyl-containing compound has been completed, conditions in the reactor are adjusted to those to be employed during polymerization and the supported chromium oxide catalyst is introduced into the reactor. The temperature employed may vary from about 30° C. to about 115° C., preferably from about 80° C. to about 110° C., and the pressure from about 70 kPa to about 7000 kPa, preferably from about 70 kPa to about 2500 kPa. When polymerization is conducted in a fluid bed, the temperature, of course, must not be permitted to rise above the sintering temperature of the polymer particles. Likewise, when polymerization is conducted in a slurry, the temperature must not be permitted to exceed the boiling point of the hydrocarbon diluent. The composition of the monomer feed will, of course, depend upon the desired polymer composition and properties. Ethylene may be employed alone if a homopolymer is desired, or together with one or more other alpha-olefins if a copolymer is desired. Such other alpha-olefins may contain from 3 to 8 carbon atoms and include, for example, propylene, butene-1, pentene-1, hexene-1, and octene-1. Preferably, such other alpha-olefins are employed in an amount sufficient to achieve a concentration of from 1.0 to 15 mol percent in the copolymer. If desired, the monomer feed may be diluted with an inert gas and/or hydrogen may be added as a chain transfer agent to control molecular weight.

Initially the supported chromium oxide catalyst is introduced into the reactor at a rate of from about 5 percent to about 100 percent of the rate normally employed during polymerization, preferably at a rate of from about 15 percent to about 50 percent of the rate normally employed during polymerization. Polymerization with said catalyst ordinarily initiates in from 0.5 hour to 8 hours after it has first been introduced into the reactor, most usually in from 0.5 hour to 4 hours after it has first been introduced into the reactor. After polymerization has initiated, the catalyst feed rate may be increased to the normal rate.

After polymerization has been initiated, it is necessary to maintain a catalytically effective amount of catalyst in the reactor to maintain reaction. During polymerization, the reactor should be maintained substantially free of undesirable catalyst poisons such as moisture, oxygen, carbon monoxide, carbon dioxide and acetylene. Occasionally, however, very small amounts of such materials may be added to influence polymer properties.

The supported chromium oxide catalysts suitable for use in polymerizing alpha-olefins are described in U.S. Pat. Nos. 2,825,721 and 3,023,203. The supported titanated chromium oxide catalysts disclosed in U.S. Pat. No. 3,622,521 can also be employed, as well as the supported fluorided and titanated chromium oxide catalysts disclosed in U.S. Pat. No. 4,011,382.

Such supported chromium oxide catalysts can be prepared by depositing a suitable chromium compound, preferably along with a titanium compound, or most preferably both a titanium compound and a fluorine compound, on a dried support, and then activating the resulting composite composition by heating it in air or oxygen at a temperature of from about 300° C. to about 900° C., preferably from about 700° C. to about 850° C., for at least two hours, preferably from about 5 hours to about 15 hours. The chromium compound, titanium compound and fluorine compound are deposited on the support in such quantities as to provide, after the activation step, the desired levels of chromium, titanium and fluorine in the catalyst.

The order of addition of the chromium compound, titanium compound and fluorine compound to the support is not critical, provided that all these compounds are added before the composite catalyst is activated, and the support is dried before the titanium compound is added thereto.

After activation, the supported catalyst should contain, based on the combined weight of the support and the chromium, titanium and fluorine materials present therein, about 0.005 to about 3.0, and preferably about 0.1 to about 1.0, weight percent of chromium (calculated as Cr), 0.0 to about 9.0, and preferably about 3.0 to about 7.0, weight percent of titanium (calculated as Ti), and 0.0 to about 2.5, and preferably about 0.1 to about 1.0, weight percent of fluorine (calculated as F).

The chromium compounds which may be used include $CrO_3$, or any compound of chromium which is ignitable to $CrO_3$ under the activation conditions employed. Chromium compounds other than $CrO_3$ which may be used are disclosed in U.S. Pat. Nos. 2,825,721 and 3,622,521 (the disclosures of which patents are hereby incorporated by reference) and include chromic acetyl acetonate, chromic nitrate, chromic acetate, chromic chloride, chromic sulfate, and ammonium chromate.

Water soluble compounds of chromium, such as $CrO_3$, are the preferred compounds for use in depositing the chromium compound on the support from a solution of the compound. Organic solvent soluble chromium compounds may also be used.

The titanium compounds which may be used include all those which are ignitable to $TiO_2$ under the activation conditions employed, especially those disclosed in U.S. Pat. Nos. 3,622,521 and 4,011,382 (the disclosures of which patents are hereby incorporated by reference). These compounds include those having the structures

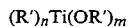

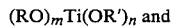

where m is 1, 2, 3 or 4; n is 0, 1, 2 or 3; and $m+n=4$;

R is a $C_1$ to $C_{12}$ alkyl, aryl or cycloalkyl group, and combinations thereof, such as aralkyl, alkaryl, and the like;

R' is R, cyclopentadienyl, and $C_2$ to $C_{12}$ alkenyl group, such as ethenyl, propenyl, isopropenyl, butenyl and the like; and X is chlorine, bromine, fluorine or iodine.

The titanium compounds would thus include titanium tetrachloride, titanium tetraisopropoxide and titanium tetrabutoxide. The titanium compounds are conveniently deposited on the support from a hydrocarbon solvent solution thereof.

The titanium (as Ti) is present in the catalyst, with respect to the Cr (as Cr), in a mol ratio of about 0 to 180, and preferably of about 4 to 35.

The fluorine compounds which may be used include HF, or any compound of fluorine which will yield HF under the activation compounds employed. Fluorine compounds other than HF which may be used are disclosed in U.S. Pat. No. 4,011,382. These compounds include ammonium hexafluorosilicate, ammonium tetrafluoroborate, and ammonium hexafluorotitanate. The fluorine compounds are conveniently deposited on the support from an aqueous solution thereof, or by dry blending the solid fluorine compounds with the other components of the catalyst prior to activation.

The support employed for the catalyst are porous, inorganic oxide materials having a high surface area, that is, a surface area in the range of about 50 to about 1000 square meters per gram, and an average particle size of about 10 to 200 microns. The inorganic oxides which may be used include silica, alumina, thoria, zirconia and other comparable inorganic oxides, as well as mixtures of such oxides.

Any grade of support can be used but microspheroidal intermediate density silica having a surface area of 300 square meters per gram, a pore diameter of about 200 Å, and an average particle size of about 70 microns is preferred (e.g., Grade 952 MS ID silica available from Davison Chemical Division, W. R. Grace and Company).

The catalyst support, which may have the chromium and/or fluorine compound deposited thereon, should be dried before it is brought into contact with the titanium compound. This is normally done by simply heating or pre-drying the catalyst support with a dry inert gas or dry air prior to use. It has been found that the temperature of drying affects the molecular weight distribution and melt index of the polymer produced. The preferred drying temperature is 100° C. to 300° C.

Activation of the supported catalyst can be accomplished at nearly any temperature up to about its sintering temperature. Activation temperatures of from about 300° C. to about 900° C. for a period of about six hours or so should be sufficient if well dried air or oxygen is used, and the temperature is not permitted to get so high as to cause sintering of the support.

Normally, the activated catalyst component is employed in the reactor in an amount of from about 0.005 weight percent to about 0.2 weight percent of the weight of polymer produced.

While polymerization can be effected in either gas phase or in a slurry, it is preferably effected in a fluid bed reaction system. Suitable fluid bed reaction systems are described, e.g., in U.S. Pat. Nos. 4,302,565 and 4,302,566, the disclosures of which are incorporated herein by reference.

The following Examples are designed to illustrate the process of the present invention and are not intended as a limitation upon the scope thereof.

EXAMPLE 1

Preparation of Chromium Oxide Catalyst

One hundred grams (100 g) of a commercial silica impregnated with chromic acetate to a concentration of 1 weight percent chromium (Grade 969 MSB silica obtained from Davison Chemical Division, W. R. Grace and Company) was admixed with 400 grams of a commercial unimpregnated silica (Grade 952 MS ID silica obtained from Davison Chemical Division, W. R. Grace and Company). The silica mixture was then dried by heating under a stream of nitrogen for about four hours at 200° C.

About 400 grams of the dried silica mixture was slurried in about 2000 ml of dry isopentane, and 140 grams of titanium tetraisopropoxide was added to the slurry. The system was thoroughly mixed and then heated to remove the isopentane.

The dried product was then transferred to an activator (heating vessel) and admixed with 4 grams of $(NH_4)_2SiF_6$. The mixture was then heated under nitrogen at a temperature of 150° C. for one hour, and then at 300° C. for an additional hour, to insure that all the isopentane was removed and to slowly remove organic residues from the titanium tetraisopropoxide so as to avoid any danger of a fire. The nitrogen stream was then replaced with a stream of dry air and the mixture was heated at 300° C. for about two hours and then at 825° C. for about eight hours to produce an activated catalyst composition. The activated catalyst was then cooled with dry air (at ambient temperature) to about 150° C., and then to room temperature with nitrogen (at ambient temperature).

After activation, the catalyst contained 0.20 percent by weight chromium, 3.74 percent by weight titanium, and 0.15 percent by weight fluorine.

EXAMPLE 2

Copolymerization of Ethylene

Ethylene was copolymerized with butene-1 in a commercial fluid bed reaction system employing the catalyst prepared in accordance with Example 1.

The reactor was charged with 64,000 kg of particulate particles of a low density ethylene-butene-1 copolymer resin which made up the bed of the reactor. The polymer particles contained a chromium oxide catalyst residue.

The polymer bed was fluidized and the system purged of moisture by passing a stream of nitrogen gas through the system which was maintained at a temperature of 85° C. and a pressure of 825 kPa throughout the purge. A portion of the nitrogen stream was recycled through the system while the remainder of the stream was withdrawn from the system by means of a vent positioned above the bed of the reactor. Purging was continued for eight hours. At the end of this time, the gas in the reaction system contained 10 ppm moisture.

Triethylaluminum was then introduced into the reactor as a 10 percent solution in isopentane. The triethylaluminum was evenly dispersed throughout the polymer bed by recycling nitrogen gas through the system. A total of 50 liters of the solution was introduced into the reactor over a three hour period. The total amount of triethylaluminum added was equivalent to 1.1 mols of this compound per mol of moisture estimated as remaining in the reactor after the purge. The moisture content of the polymer bed was estimated from the moisture content of the gas phase of the reaction system by assuming that one gram of polymer contains a like amount of moisture as one gram of gas.

Dispersion of the triethylaluminum in the polymer bed by the recycle of nitrogen was continued for two hours following the final addition of this material to the reactor. At the end of this time, 34 kg of silica (Grade 952 MS ID silica obtained from Davison Chemical Division, W. R. Grace and Company) were introduced into the reactor and dispersed throughout the polymer bed by means of the same continuous flow of nitrogen. The amount of silica employed was equivalent to 1.1 kg per mol of triethylaluminum previously introduced into reactor. Prior to introducing the silica into the reactor it was dried at 200° C. for 4 hours.

The silica and triethylaluminum were dispersed throughout the polymer bed together for one hour. At the end of this time, the reaction system was vented to reduce the pressure to 550 kPa, and then repressurized to 2100 kPa with ethylene, butene-1, and hydrogen, in order to reduce the nitrogen content of the reaction system and establish reaction conditions. The ethylene, butene-1 and hydrogen were continuously introduced into the reactor at a rate sufficient to maintain a butene-1/ethylene molar ratio of 0.088:1 and a hydrogen/ethylene molar ratio of 0.001:1. A superficial gas velocity of 1.5 feet/second was employed. The temperature of the gas stream was adjusted to maintain the reactor temperature at 88° C.

The chromium oxide catalyst prepared as described in Example 1 was then introduced into the reactor at a rate of about 0.25 kg per hour. Polymerization began smoothly within one-half hour after the catalyst was first introduced into the reactor. The amount of chromium oxide introduced into the reactor at this point represented an ash content of less than 0.002 weight percent. Such ash content is only about one-fifth the amount of catalyst necessary to carry out reaction at the normal rate (normally 0.01 weight percent ash).

After polymerization had initiated, the catalyst feed was gradually increased over a five hour period to a rate of 1.6 kg per hour. All other reaction conditions were maintained constant during this time. Six hours after the catalyst was first introduced into the reactor, polymer production reached a rate of 6500 kg per hour. Within 10 hours from the time the catalyst had first been introduced into the reactor, a production rate of 12,000 kg of copolymer per hour was attained. No hot-spotting or reactor fouling occurred during the time. In general, desired polymer properties were obtained within three bed turnovers following start-up.

EXAMPLE 3

Copolymerization of Ethylene

Ethylene was copolymerized with butene-1 employing the same catalyst and fluid bed reaction system employed in Example 2.

As in Example 2, the reactor was charged with 64,000 kg of particulate particles of a low density ethylene-butene-1 copolymer containing a chromium oxide catalyst residue and the reaction system was purged with nitrogen gas while maintaining a temperature of 85° C. and a pressure of 825 kPa in the reactor. Purging was continued for five hours. At the end of this time, the gas in the reaction system contained 20 ppm moisture.

Contrary to Example 2, however, in this example silica was introduced into the reactor before the triethylaluminum. A total of 100 kg of silica was added (Grade 952 MS ID silica obtained from Davison Chemical Division, W. R. Grace and Company), which was equivalent to 1.2 kg per mol of triethylaluminum later added to the reactor. Prior to introducing the silica into the reactor it was dried at 200° C. for 4 hours.

Immediately following the addition of the silica to the bed, triethylaluminum was introduced into the reactor as a 10 percent solution in isopentane. The triethylaluminum and silica were evenly dispersed throughout the bed by recycling nitrogen gas through the system. A total of 140 liters of the triethylaluminum solution was introduced into the reactor over a 3 hour period. The amount of triethylaluminum added was equivalent to 1.5 mols of this compound per mol of moisture estimated as remaining in the reactor after the purge. The moisture content of the polymer bed was estimated in the same manner as in Example 2.

After the addition of the triethylaluminum solution was completed, the silica and triethylaluminum were dispersed throughout the polymer bed together for one hour. At the end of this time, the reaction system was vented to reduce the pressure to 550 kPa, and then repressurized to 2100 kPa with ethylene, butene-1, and hydrogen, in order to reduce the nitrogen content of the reaction system and establish reaction conditions. The ethylene, butene-1 and hydrogen were continuously introduced into the reactor at a rate sufficient to maintain a butene-1/ethylene molar ratio of 0.088:1 and a hydrogen/ethylene molar ratio of 0.001:1. A superficial gas velocity of 1.5 feet/second was employed. The temperature of the gas stream was adjusted to maintain the reactor temperature at 88° C.

The chromium oxide catalyst prepared as described in Example 1 was then introduced into the reactor at a rate of about 0.25 kg. per hour. Polymerization began smoothly within two hours after the catalyst was first introduced into the reactor. The amount of chromium oxide introduced into the reactor at this point represented an ash content of 0.004 weight percent. Such ash content is less than one-half the amount of catalyst necessary to carry out reaction at the normal rate (normally 0.01 weight percent ash).

After polymerization had initiated, the catalyst feed was gradually increased over a five hour period to a rate of 1.4 kg per hour. All other reaction conditions were maintained constant during this time. Six hours after the catalyst was first introduced into the reactor, polymer production reached a rate of 5200 kg per hour. Within 10 hours from the time the catalyst had first been introduced into the reactor, a production rate of 10,500 kg of copolymer per hour was attained. No hot-spotting or reactor fouling occurred during this time. Desired polymer properties were obtained within 2.5 bed turnovers following start-up.

We claim:

1. A method for initiating homopolymerization of ethylene, or copolymerization of ethylene with at least one other alpha-olefin containing from 3 to 8 carbon atoms, employing a supported chromium oxide catalyst which comprises
   (1) adding an alkylaluminum compound and a hydroxyl-containing compound to the reactor of a fluidized bed polymerization reaction system prior to the commencement of polymerization, and subjecting said alkylaluminum compound and said hydroxyl-containing compound to a pressure of from 350 kPa to 2000 kPa and a temperature of from 20° C. to 150° C. for a time sufficient for said alkylaluminum compound to react completely with the moisture present in said reactor and said hydroxyl-containing compound,
   said alkylaluminum compound having the formula $AlR_aR_bR_c$ wherein $R_a$, $R_b$ and $R_c$ are alkyl radicals containing from 1 to 12 carbon atoms, and said alkylaluminum compound being added to said reactor in an amount sufficient to react with at least a major amount of the moisture present in the reaction system,
   said hydroxyl-containing compound having carbon-hydroxyl or metal-hydroxyl linkages which are capable of reacting with the alkylaluminum compound to form a Lewis salt, and said hydroxyl-containing compound being added to said reactor in an amount sufficient to react with all of the alkylaluminum compound added to the reactor, and
   (2) introducing a supported chromium oxide catalyst into the reactor under polymerization conditions suitable for said catalyst at a rate of from 5 percent to 100 percent of the rate normally employed during polymerization, and maintaining said conditions until polymerization is initiated.

2. A method as in claim 1 wherein the reaction system is purged with an inert gas to a moisture content no greater than 50 ppm before the alkylaluminum compound and the hydroxyl-containing compound are added to the reactor.

3. A method as in claim 2 wherein $R_a$, $R_b$ and $R_c$ of the alkylaluminum compound are alkyl radicals containing from 1 to 6 carbon atoms.

4. A method as in claim 3 wherein the hydroxyl-containing compound is silica.

5. A method as in claim 4 wherein the alkylaluminum compound is triethylaluminum.

6. A method as in claim 3 wherein the hydroxyl-containing compound has a hydroxyl content of from 0.1 mmol/g to 10 mmol/g.

7. A method as in claim 6 wherein the hydroxyl-containing compound has a surface area of from 50 square meters per gram to 1000 square meters per gram, and an average particle size no greater than 200 microns.

8. A method as in claim 7 wherein the hydroxyl-containing compound is silica.

9. A method as in claim 8 wherein the alkylaluminum compound is triethylaluminum.

10. A method as in claim 1 wherein the reaction system as purged with an inert gas to a moisture content no greater than 20 ppm before the alkylaluminum compound and the hydroxyl-containing compound are added to the reactor.

11. A method as in claim 10 wherein from 1 mol to 2 mols of the alkylaluminum compound are added to the reactor per mol of moisture in the reaction system and the hydroxyl-containing compound is added to the reactor in an amount of from 150 percent to 600 percent of the stoichiometric amount required to react with at least one alkyl group of each alkylaluminum molecule of the alkylaluminum compound employed.

12. A method as in claim 11 wherein $R_a$, $R_b$ and $R_c$ of the alkylaluminum compound are alkyl radicals containing from 1 to 6 carbon atoms.

13. A method as in claim 12 wherein the hydroxyl-containing compound is silica.

14. A method as in claim 13 wherein the alkylaluminum compound is triethylaluminum.

15. A method as in claim 12 wherein the hydroxyl-containing compound has a hydroxyl content of from 0.1 mmol/g to 10 mmol/g.

16. A method as in claim 15 wherein the hydroxyl-containing compound has a surface area of from 50 square meters per gram to 1000 square meters per gram, and an average particle size no greater than 200 microns.

17. A method as in claim 16 wherein the hydroxyl-containing compound is silica.

18. A method as in claim 17 wherein the alkylaluminum compound is triethylaluminum.

19. A method as in claim 11 wherein the supported chromium oxide catalyst is introduced into the reactor at a rate of from 15 percent to 50 percent of the rate normally employed during polymerization.

20. A method as in claim 19 wherein $R_a$, $R_b$ and $R_c$ of the alkylaluminum compound are alkyl radicals containing from 1 to 6 carbon atoms.

21. A method as in claim 20 wherein the hydroxyl-containing compound is silica.

22. A method as in claim 21 wherein the alkylaluminum compound is triethylaluminum.

23. A method as in claim 20 wherein the hydroxyl-containing compound has a hydroxyl content of from 0.1 mmol/g to 10 mmol/g.

24. A method as in claim 23 wherein the hydroxyl-containing compound has a surface area of from 50 square meters per gram to 1000 square meters per gram, and an average particle size no greater than 200 microns.

25. A method as in claim 24 wherein the hydroxyl-containing compound is silica.

26. A method as in claim 25 wherein the alkylaluminum compound is triethylaluminum.

27. A method as in claim 25 wherein the alkylaluminum compound is added to the reactor prior to the addition of the hydroxyl-containing compound.

28. A method as in claim 27 wherein the alkylaluminum compound is triethylaluminum.

29. A method as in claiim 25 wherein the particulate polymer particles which make up the bed of the fluidized reaction system contain a chromium oxide catalyst residue and the hydroxyl-containing compound is added to the reactor prior to the addition of the alkylaluminum compound.

30. A method as in claim 29 wherein the alkylaluminum compound is triethylaluminum.

* * * * *